(12) United States Patent
Yu

(10) Patent No.: US 9,468,155 B2
(45) Date of Patent: Oct. 18, 2016

(54) PLANTING WALL CONTAINER STRUCTURE

(71) Applicant: Chi-Wang Yu, Taichung (TW)

(72) Inventor: Chi-Wang Yu, Taichung (TW)

( * ) Notice: Subject to any disclaimer, the term of this patent is extended or adjusted under 35 U.S.C. 154(b) by 0 days.

(21) Appl. No.: 14/555,670

(22) Filed: Nov. 27, 2014

(65) Prior Publication Data
US 2015/0082698 A1    Mar. 26, 2015

(51) Int. Cl.
*A01G 9/02* (2006.01)

(52) U.S. Cl.
CPC .............. *A01G 9/025* (2013.01); *Y02P 60/244* (2015.11)

(58) Field of Classification Search
CPC ........ A01G 9/02; A01G 9/022; A01G 9/023; A01G 9/025; A01G 9/027; A01G 9/028
USPC .................. 47/47, 65.5, 65.9, 67, 82, 83, 86
See application file for complete search history.

(56) References Cited

U.S. PATENT DOCUMENTS

| | | | | |
|---|---|---|---|---|
| 5,287,650 A | * | 2/1994 | Moriguchi | E04D 11/002 47/59 R |
| 5,647,695 A | * | 7/1997 | Hilfiker | E01F 8/025 405/258.1 |
| 8,966,819 B1 | * | 3/2015 | Cosmann | A01G 9/023 47/83 |
| 2007/0199241 A1 | * | 8/2007 | Peleszezak | E01F 8/022 47/65.9 |
| 2012/0222352 A1 | * | 9/2012 | Janssen | A01G 9/025 47/65.7 |

* cited by examiner

*Primary Examiner* — William Gilbert

(57) ABSTRACT

A planting wall container structure includes a container main body and a planting panel. When the stem of a plant is inserted through any one of hole sealing portions of the planting panel to pass a through hole, a central aperture will be enlarged and clip pieces will be deformed to retain the stem of the plant. Plants can be inserted through the hole sealing portions to enter a soil accommodation room of the container main body. The soil accommodation room is filled with planting soil and poured with water for planting the plants on a front wall board. The water poured into the soil accommodation room is first stored in an upper water storage trough, and then the excess water flows to a lower storage trough guided by a liquid pass space to form multi-stage water storage before the water is drained through a drain hole.

7 Claims, 11 Drawing Sheets

PLANTING WALL CONTAINER STRUCTURE

BACKGROUND OF THE INVENTION

1. Field of the Invention

The invention relates to a wall-mounted water-holding plant container for green plants, such as vines and more particularly to a container enabling plants to be easily grown, infrequently watered, and minimally cared for.

2. Description of Related Art

Metropolitan cities tend to lack open green space due to expensive and limited land costs. Plants not only beautify their surroundings but improve air quality and reduce noise pollution. Viewing greenery also improves eyesight and sharpens thinking as well.

To reconcile the scarcity of green space and the need for them in urban settings, many work-spaces currently rely on multiple small hanging or bracket-supported potted plants to form living walls of green landscape. However, an inordinate amount of time, labor, material, and money are required to turn these potted plants into large green walls. Additionally, keeping these small potted plants moisturized long enough and evenly is challenging and costly. When the plants are watered, the water immediately drains out of the bottom of each of these traditional containers, thereby wasting much precious water resource. To grow these plants successfully, it is essential to water these plants infrequently and retain their moisture relatively long while keeping the plants' roots from flooding. The inventor devoted years of practical experimentation to solve the problem of wasting water yet retaining it longer in the planter with his invention.

SUMMARY OF THE INVENTION

The primary object of the invention is to provide a planting wall container structure which comprises a planting container. The planting container comprises a container main body and a planting panel. The container main body comprises a bottom board. Two side wall boards, a rear wall board, and a front wall board extend upward to form a soil accommodation room. A lower water storage trough is formed in the soil accommodation room above the bottom board. A space is formed beside the lower water storage trough. The bottom board is formed at least one drain hole corresponding in position to the space, such that the water flowing to the space can be drained through the drain hole. The rear wall board is provided with at least one upper water storage trough. A liquid pass space is formed between the upper water storage trough and the front wall board. The front wall board is formed with a plurality of through holes. The planting panel is a flexible panel. The planting panel is mounted on the front wall board of the container main body. The planting panel has a plurality of hole sealing portions corresponding in position to the through holes. Each of the hole sealing portions has a central aperture for stopping the soil in the soil accommodation room from passing the central aperture, and a plurality of cut lines extend from the wall of the central aperture and are arranged radially to form a plurality of clip pieces. When the stem of a plant is inserted through any one of the hole sealing portions of the planting panel to pass the relative through hole, the central aperture will be enlarged and the clip pieces will be deformed to confine and retain the stem of the plant. In this way, many plants can be inserted through the hole sealing portions of the planting panel to enter the soil accommodation room of the container main body. The soil accommodation room is filled with planting soil and poured with water for planting the plants on the front wall board. The water poured into the soil accommodation room is first stored in the upper water storage trough, and then the excess water flows to the lower storage trough guided by the liquid pass space to form multi-stage water storage before the water is drained through the drain hole. The plants at the upper and lower positions of the front wall board can get enough water through the upper water storage trough or the lower water storage trough, such that the frequency of watering can be decreased effectively and the convenience for planting can be enhanced.

A further object of the invention is to provide a planting wall container structure, wherein the inner bottom of the lower water storage trough of the container main body is provided with a water guide pipe. One end of the water guide pipe extends out of the surface of the front wall board and is provided with a water level detector, such that the user can know the water level of the lower water storage trough by means of the water lines of the water level detector through the outer surface of the front wall board to decide whether or not to water the plants inside the container main body.

A further yet object of the invention is to provide a planting wall container structure, wherein the bottom board of the container main body is further provided with a water tray. The water tray is adapted to receive the excess water drained from the drain hole, preventing the water from polluting the surroundings.

Another object of the invention is to provide a planting wall container structure, wherein the front wall board of the container main body has a plurality of buckle holes around the through holes. The planting panel is provided with a plurality of buckle members corresponding in position to the buckle holes. Through engagement of the buckle members and the buckle holes, the planting panel can be assembled on the front wall board quickly.

A further object of the invention is to provide a planting wall container structure, wherein the rear wall board of the container main body has a plurality of notches which are disposed at an equal altitude. The upper water storage trough is provided with a plurality of hooks corresponding in position to the notches. Through the hooks to be engaged in the notches, the upper water storage trough can be assembled on the rear wall board easily.

A further yet object of the invention is to provide a planting wall container structure, wherein the two side wall boards, the rear wall board, and the front wall board are inclined outwardly from the bottom board of the container main body to form the soil accommodation room which is tapered from top to bottom. Before the upper water storage trough and the planting panel are assembled to the rear wall board and the front wall board, the upper water storage and the planting panel can be placed in the lower water storage trough. When not in use, a plurality of planting containers can be stacked through the container main bodies to reduce the space for carrying, transportation, and storage. The upper edges of the rear wall board and the front wall board of the container main body are provided with two pairs of handles close to the two side wall boards. Each handle has a grip which is transversely disposed between the rear wall board and the front wall board. The upper and lower edges of the rear wall board and the front wall board have upper engaging recesses and lower engaging recesses corresponding in position to the grips of the handles for the grips to be inserted therein. When the container main bodies of the planting containers are stacked, the grips of the handles can be lifted to separate the container main body from the container main body. After the grips of the handles of the container main body are turned to be engaged in the upper engaging recesses, the bottom of the other container main body is positioned and supported by the grips of the handles engaged in the lower engaging recesses. A plurality of planting containers can be connected with each other to build a large-sized planting wall. Every two planting containers are stacked each other. The upper water storage trough of the lower container main body is aligned with the drain hole of the upper container main body. When the uppermost planting container is watered, each of the lower planting containers can get water in sequence. The rear wall board of the container main body is formed with a plurality of nail holes disposed near the upper edge of the rear wall board. When the planting containers are connected with each other, they can be fixed to the wall by nails inserted through the nail holes to enhance the safety.

The above and other objects, features and advantages of the invention will become apparent from the following detailed description taken with the accompanying drawings.

DETAILED DESCRIPTION OF THE INVENTION

Embodiments of the invention will now be described, by way of example only, with reference to the accompanying drawings.

Figure 1:
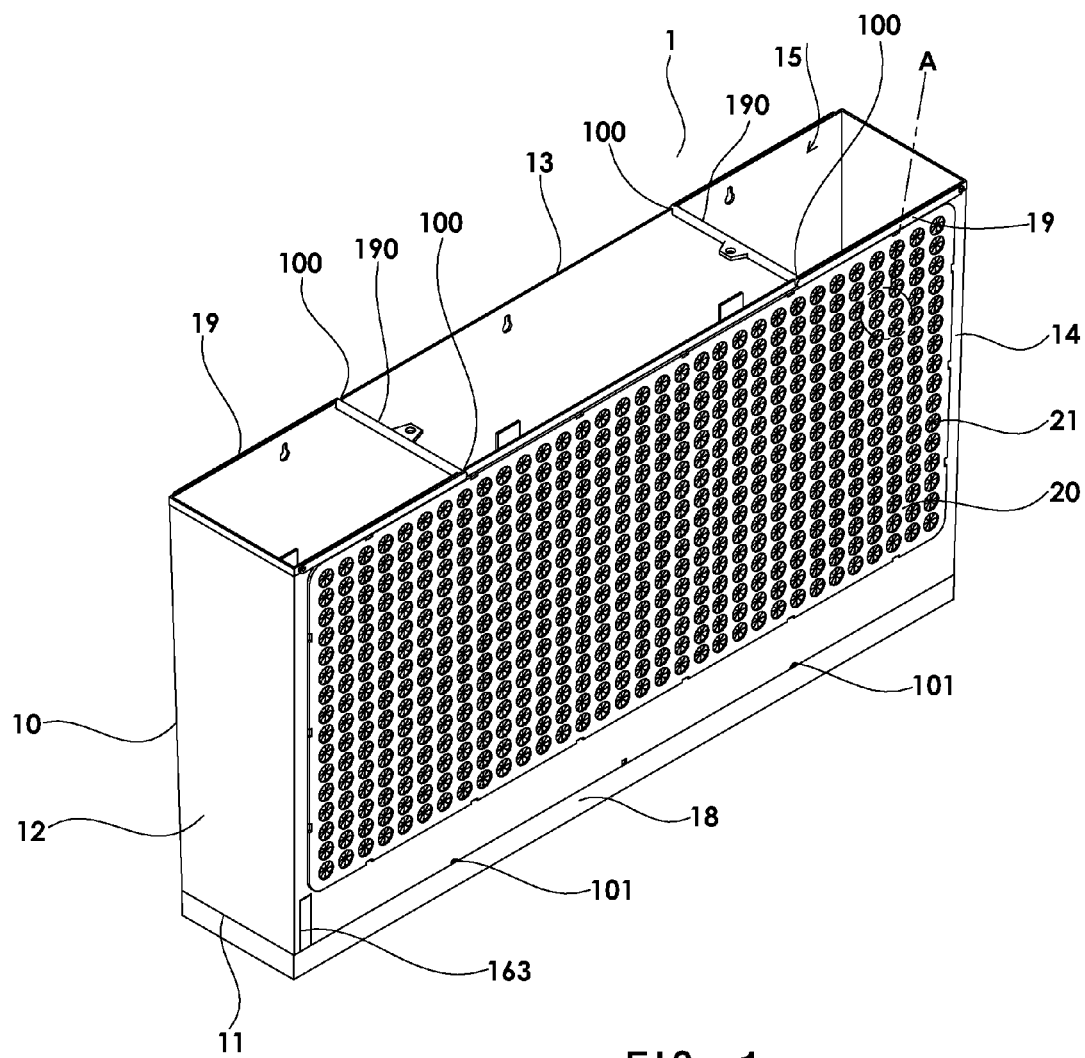
FIG. 1 is a perspective view according to a preferred embodiment of the invention.
Figure 2:
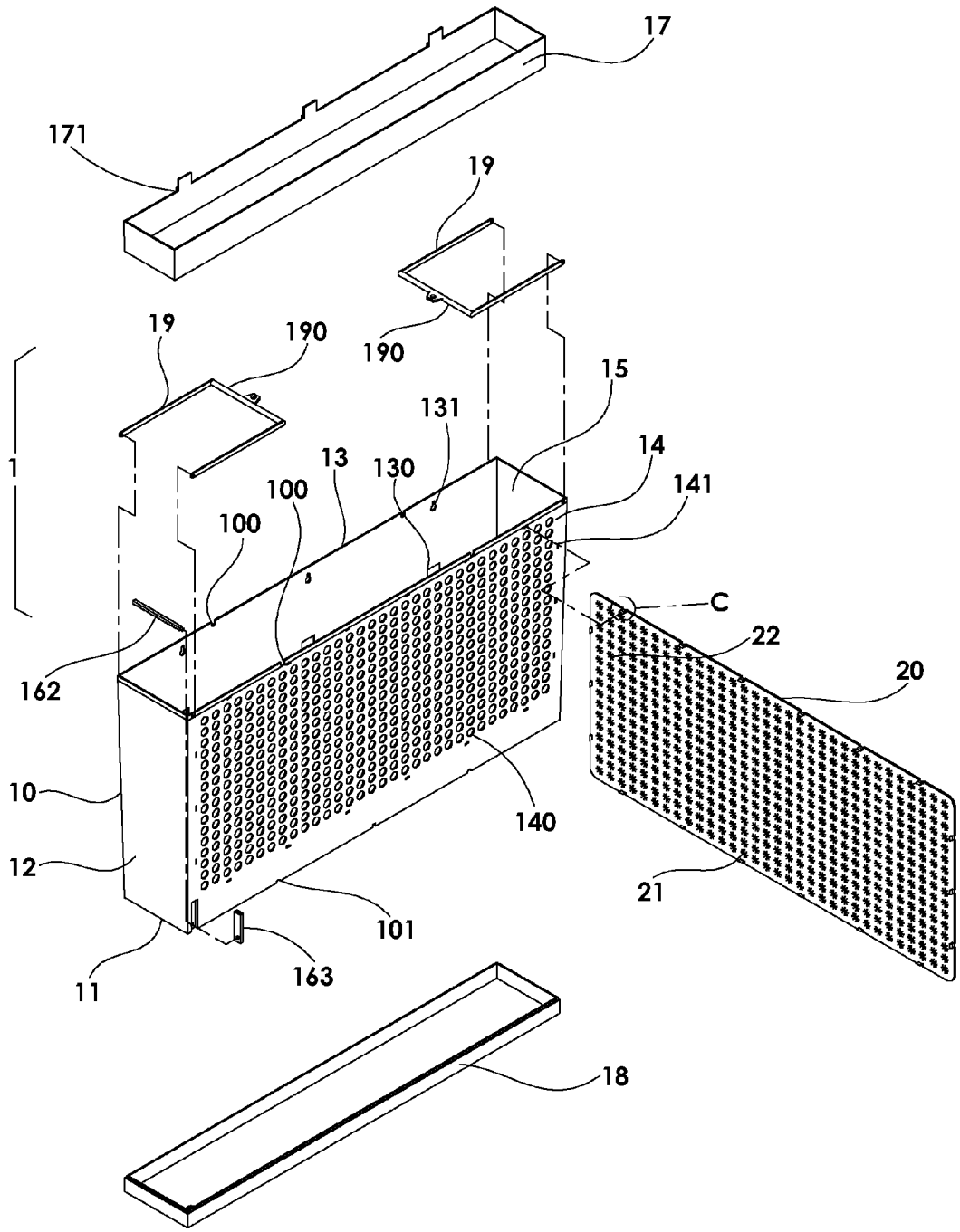
FIG. 2 is an exploded view according to the preferred embodiment of the invention.
Figure 3:
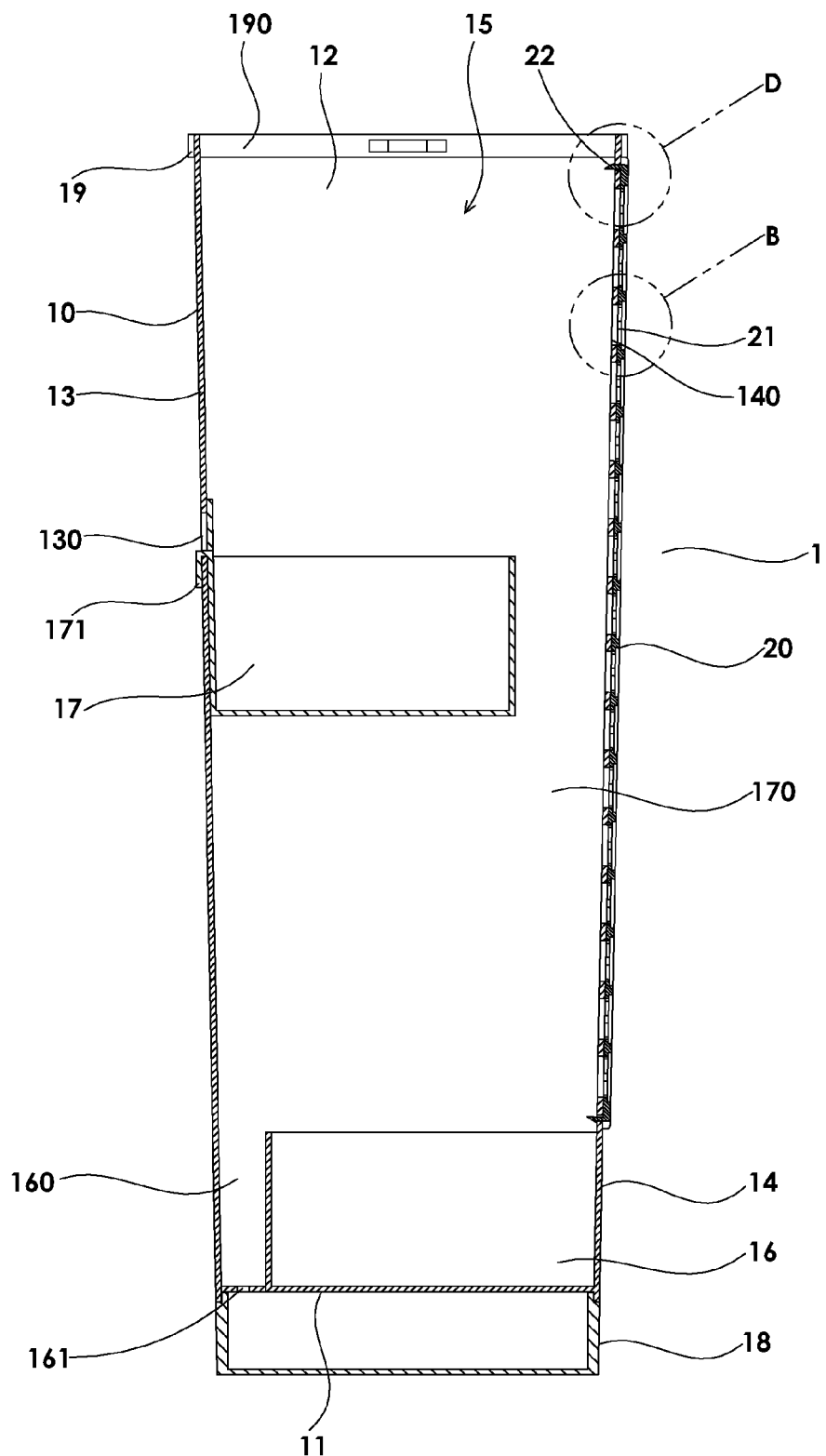
FIG. 3 is a sectional view according to the preferred embodiment of the invention.
Figure 4:
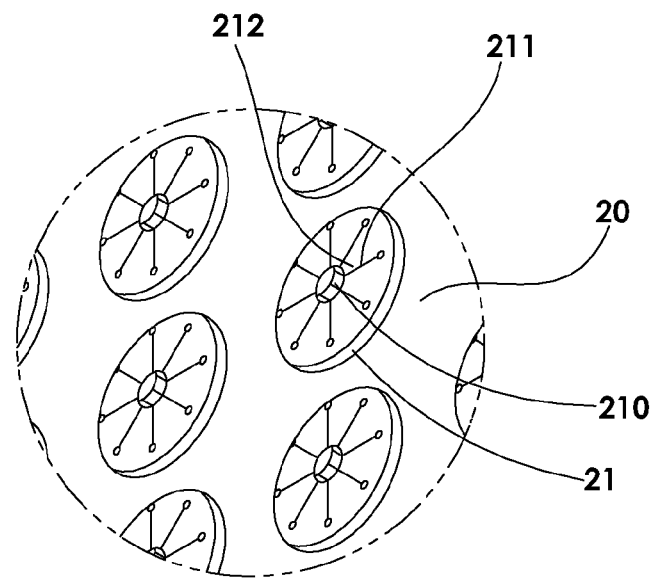
FIG. 4 is an enlarged view taken from circle A of FIG. 1.
Figure 5:
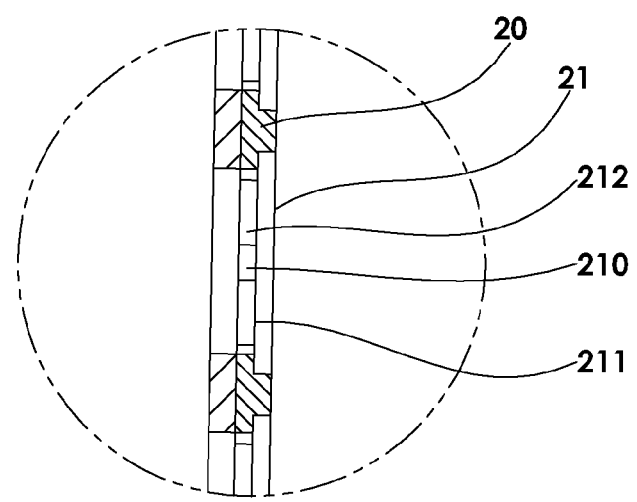
FIG. 5 is an enlarged view taken from circle B of FIG. 3.
Figure 6:
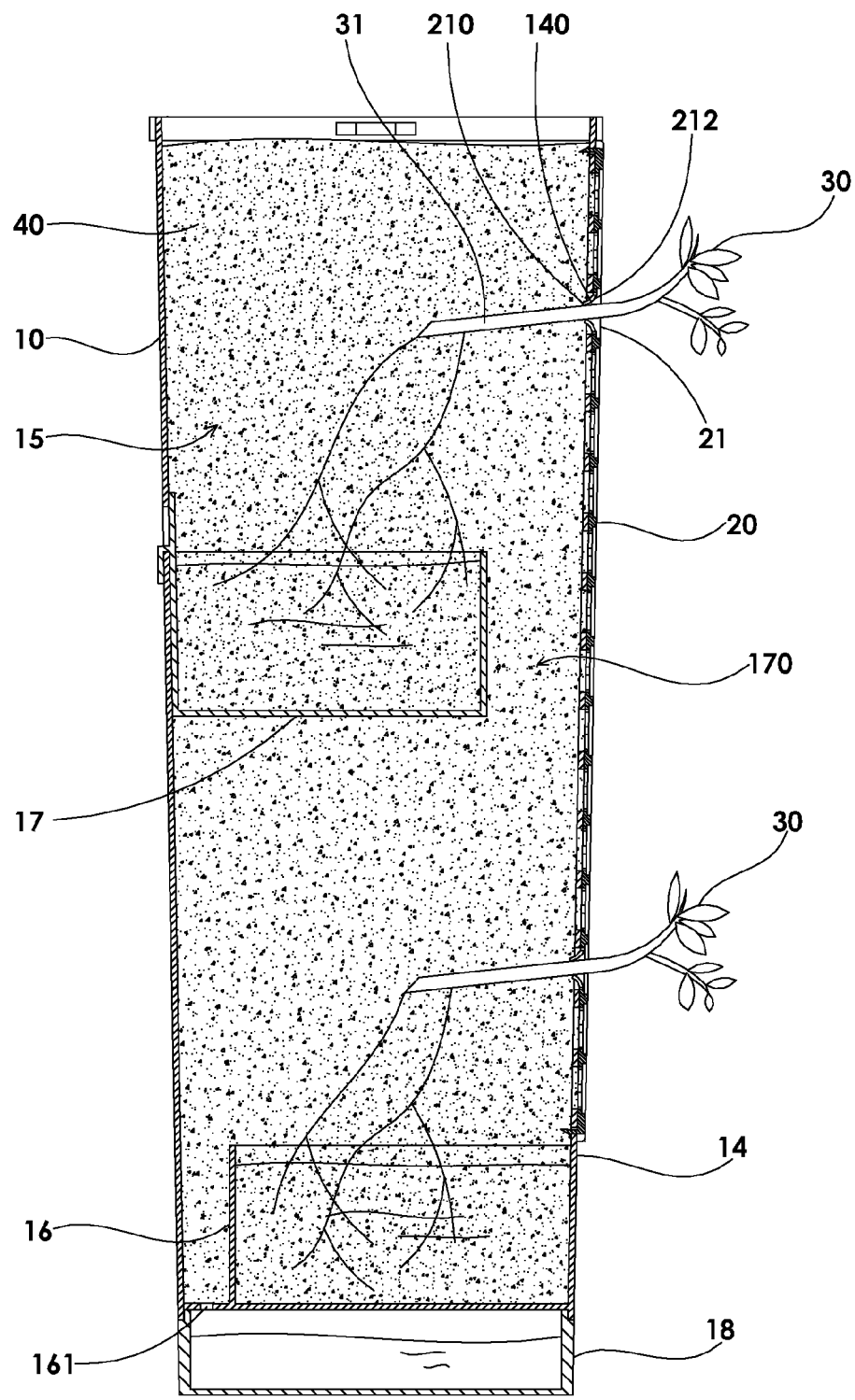
FIG. 6 is a schematic view of the preferred embodiment of the invention when in use.

As shown in FIG. 1, FIG. 2, and FIG. 3, the invention discloses a planting wall container structure which comprises a planting container 1. The planting container 1 comprises a container main body 10 and a planting panel 20. The container main body 10 comprises a bottom board 11. Two side wall boards 12, a rear wall board 13, and a front wall board 14 extend upward to form a soil accommodation room 15. A lower water storage trough 16 is formed in the soil accommodation room 15 above the bottom board 11. A space 160 is formed beside the lower water storage trough 16. The bottom board 11 is formed at least one drain hole 161 corresponding in position to the space 160, such that the water flowing to the space 160 can be drained through the drain hole 161. The rear wall board 13 is provided with at least one upper water storage trough 17. A liquid pass space 170 is formed between the upper water storage trough 17 and the front wall board 14. The front wall board 14 is formed with a plurality of through holes 140. The planting panel 20 is a flexible panel made of a plastic material. The planting panel 20 is mounted on the front wall board 14 of the container main body 10. The planting panel 20 has a plurality of hole sealing portions 21 corresponding in position to the through holes 140. As shown in FIG. 1, FIG. 3, FIG. 4, and FIG. 5, each of the hole sealing portions 21 has a central aperture 210 for stopping the soil in the soil accommodation room 15 from passing the central aperture 210, and a plurality of cut lines 211 extend from the wall of the central aperture 210 and are arranged radially to form a plurality of clip pieces 212. As shown in FIG. 5 and FIG. 6, when the stem 31 of a plant 30 is inserted through any one of the hole sealing portions 21 of the planting panel 20 to pass the relative through hole 140, the central aperture 210 will be enlarged and the clip pieces 21 will be deformed to confine and retain the stem 31 of the plant 30. In this way, many plants 30 can be inserted through the hole sealing portions 21 of the planting panel 20 to enter the soil accommodation room 15 of the container main body 10. The soil accommodation room 15 is filled with planting soil 40 and poured with water for planting the plants 30 on the front wall board 14. The water poured into the soil accommodation room 15 is first stored in the upper water storage trough 17, and then the excess water flows to the lower storage trough 16 guided by the liquid pass space 170 to form multi-stage water storage before the water is drained through the drain hole 161. The plants 30 at the upper and lower positions of the front wall board 14 can get enough water through the upper water storage trough 17 or the lower water storage trough 16, such that the frequency of watering can be decreased effectively and the convenience for planting can be enhanced.

Figure 7:
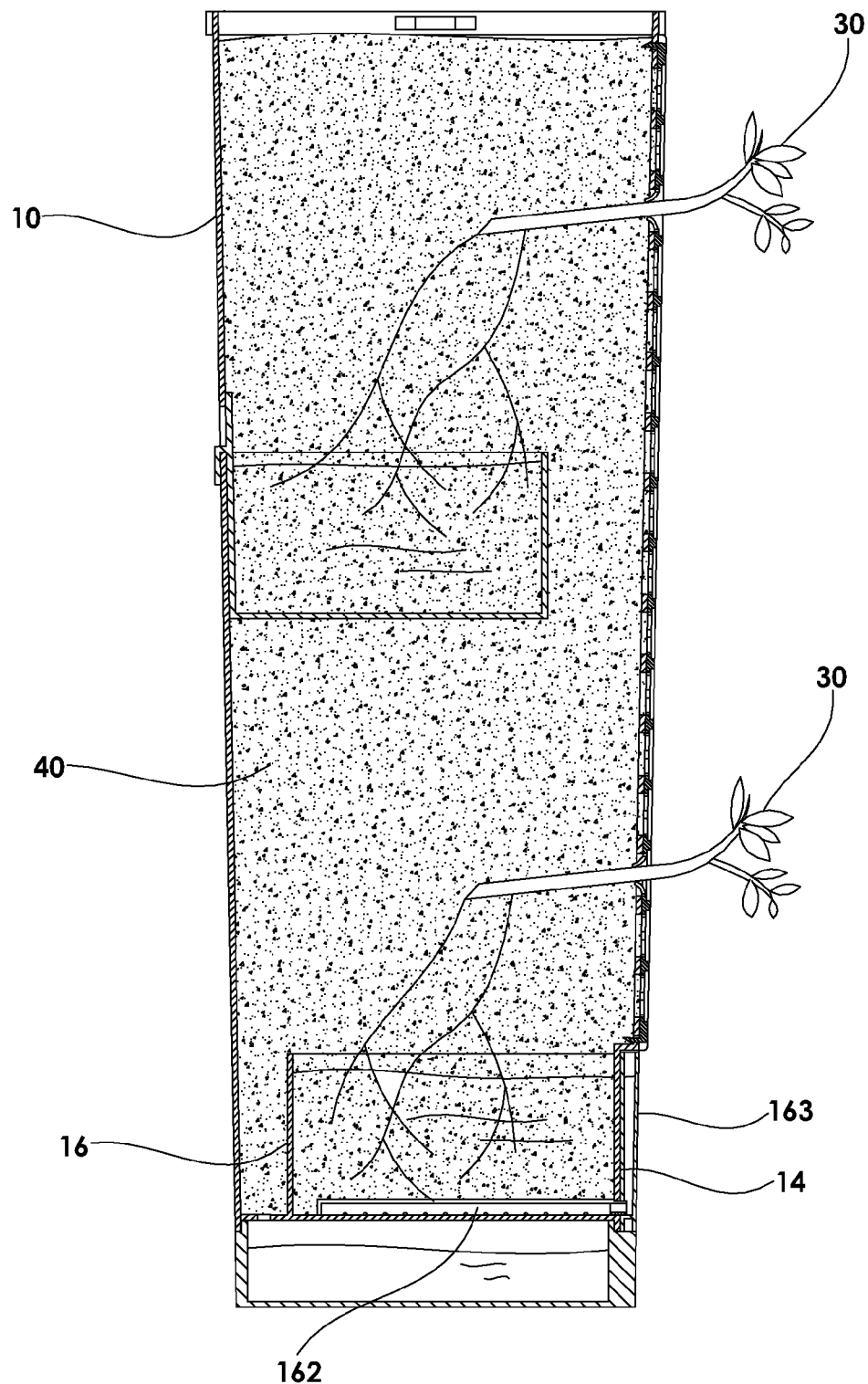
FIG. 7 is a sectional view showing the lower water storage trough provided with the water level detector according to the preferred embodiment of the invention.
Figure 8:
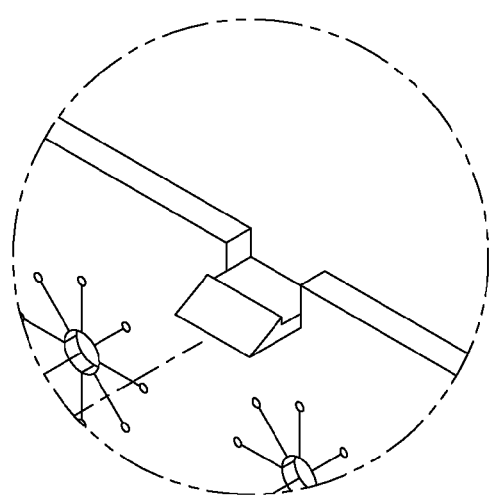
FIG. 8 is an enlarged view taken from circle C of FIG. 2.
Figure 9:
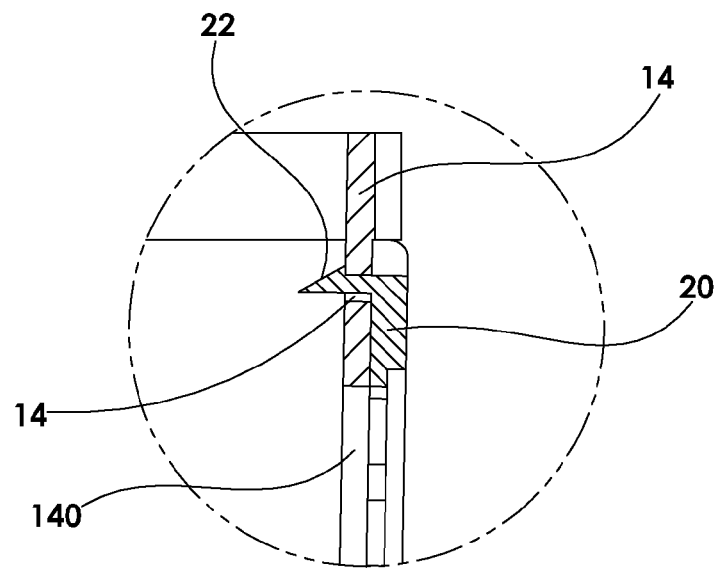
FIG. 9 is an enlarged view taken from circle D of FIG. 3.

According to the aforesaid embodiment, as shown in FIG. 1, FIG. 2, and FIG. 7, the inner bottom of the lower water storage trough 16 of the container main body 10 is provided with a water guide pipe 162 which is able to filter the soil 40. One end of the water guide pipe 162 extends out of the surface of the front wall board 14 and is provided with a water level detector 163 made of a transparent material, such that the user can know the water level of the lower water storage trough 16 by means of the water lines of the water level detector 163 through the outer surface of the front wall board 14 to decide whether or not to water the plants 30 inside the container main body 10.

According to the aforesaid embodiment, as shown in FIG. 1, FIG. 2, and FIG. 6, the bottom board 11 of the container main body 10 is further provided with a water tray 18. The water tray 18 is adapted to receive the excess water drained from the drain hole 16, preventing the water from polluting the surroundings.

According to the aforesaid embodiment, as shown in FIG. 2, FIG. 3, FIG. 8, and FIG. 9, the front wall board 14 of the container main body 10 has a plurality of buckle holes 14 around the through holes 140. The planting panel 20 is provided with a plurality of barb-type buckle members 22 corresponding in position to the buckle holes 141. Through engagement of the buckle members 22 and the buckle holes 141, the planting panel 20 can be assembled on the front wall board 14 quickly.

According to the aforesaid embodiment, as shown in FIG. 2 and FIG. 3, the rear wall board 13 of the container main body 10 has a plurality of notches 130 which are disposed at an equal altitude. The upper water storage trough 17 is provided with a plurality of hooks 171 corresponding in position to the notches 130. Through the hooks 171 to be engaged in the notches 130, the upper water storage trough 17 can be assembled on the rear wall board 13 easily.

Figure 10:
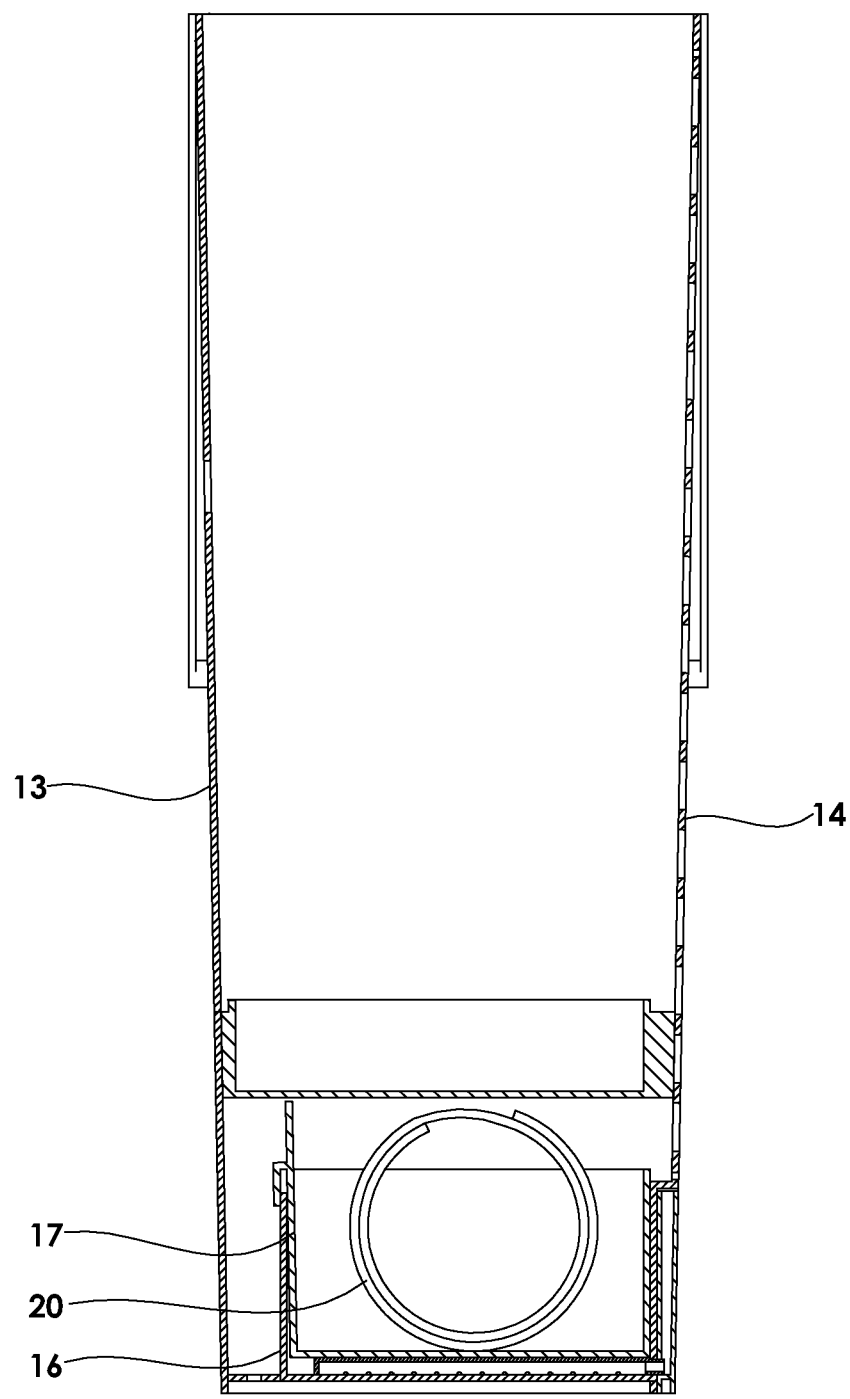
FIG. 10 is a schematic view showing the upper water storage trough and the planting panel in a storage state of the invention before use.
Figure 11:
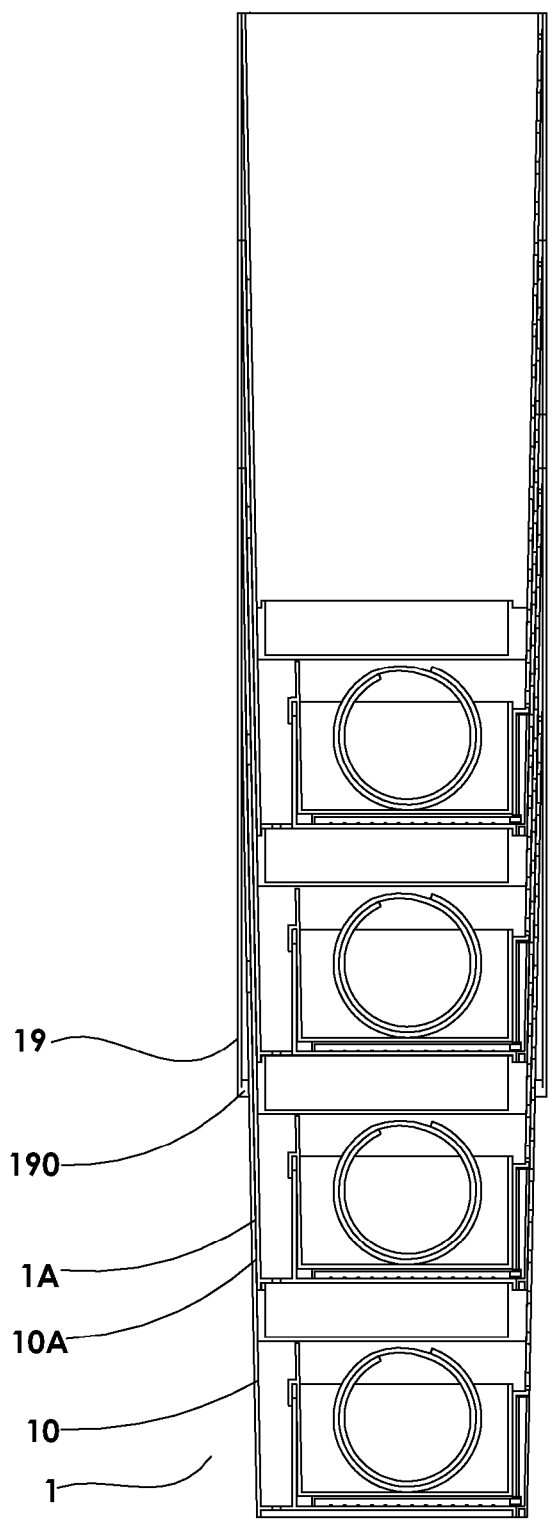
FIG. 11 is a schematic view showing that the container main bodies of the invention are stacked up.
Figure 12:
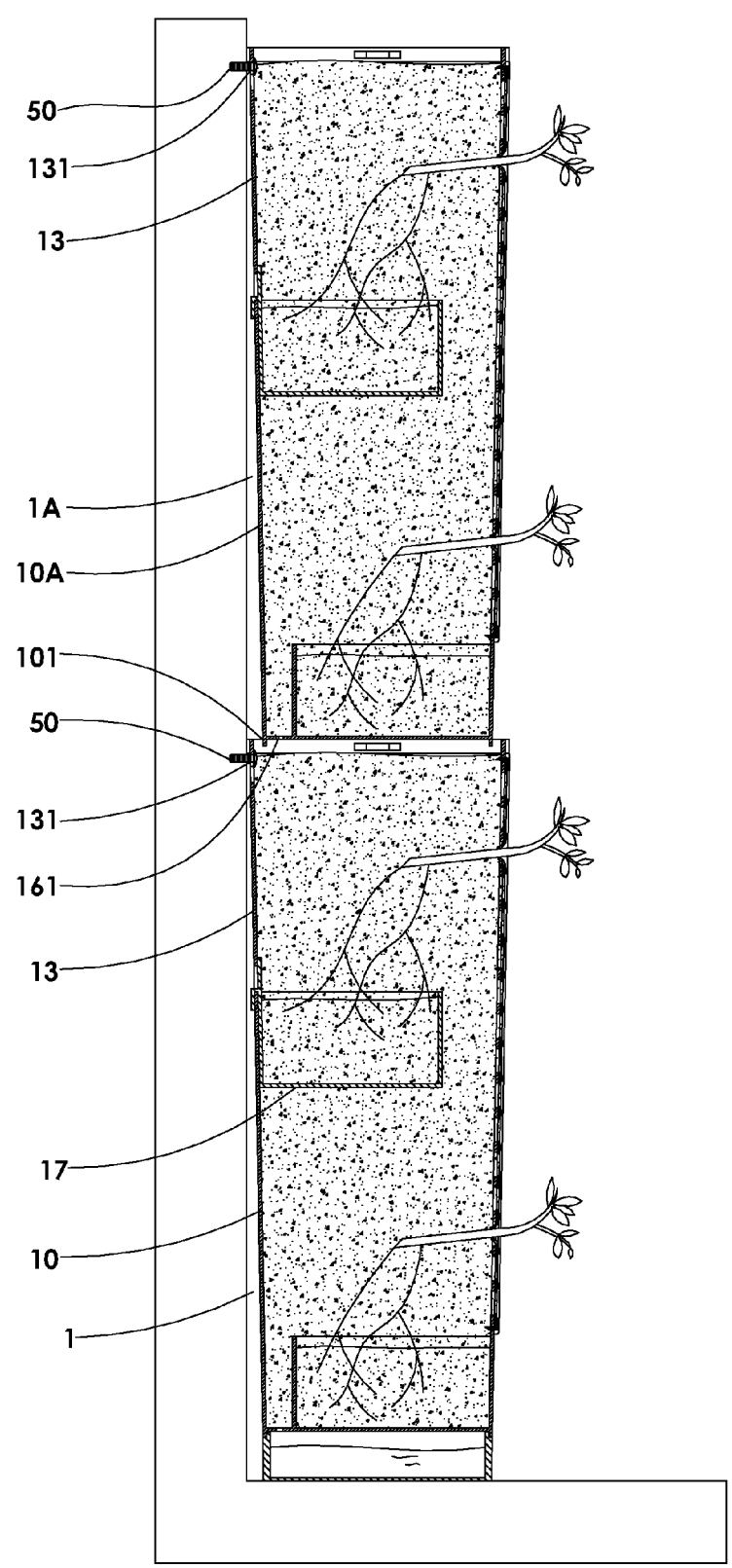
FIG. 12 is a schematic view showing the connected planting containers of the invention when in use.
Figure 13:
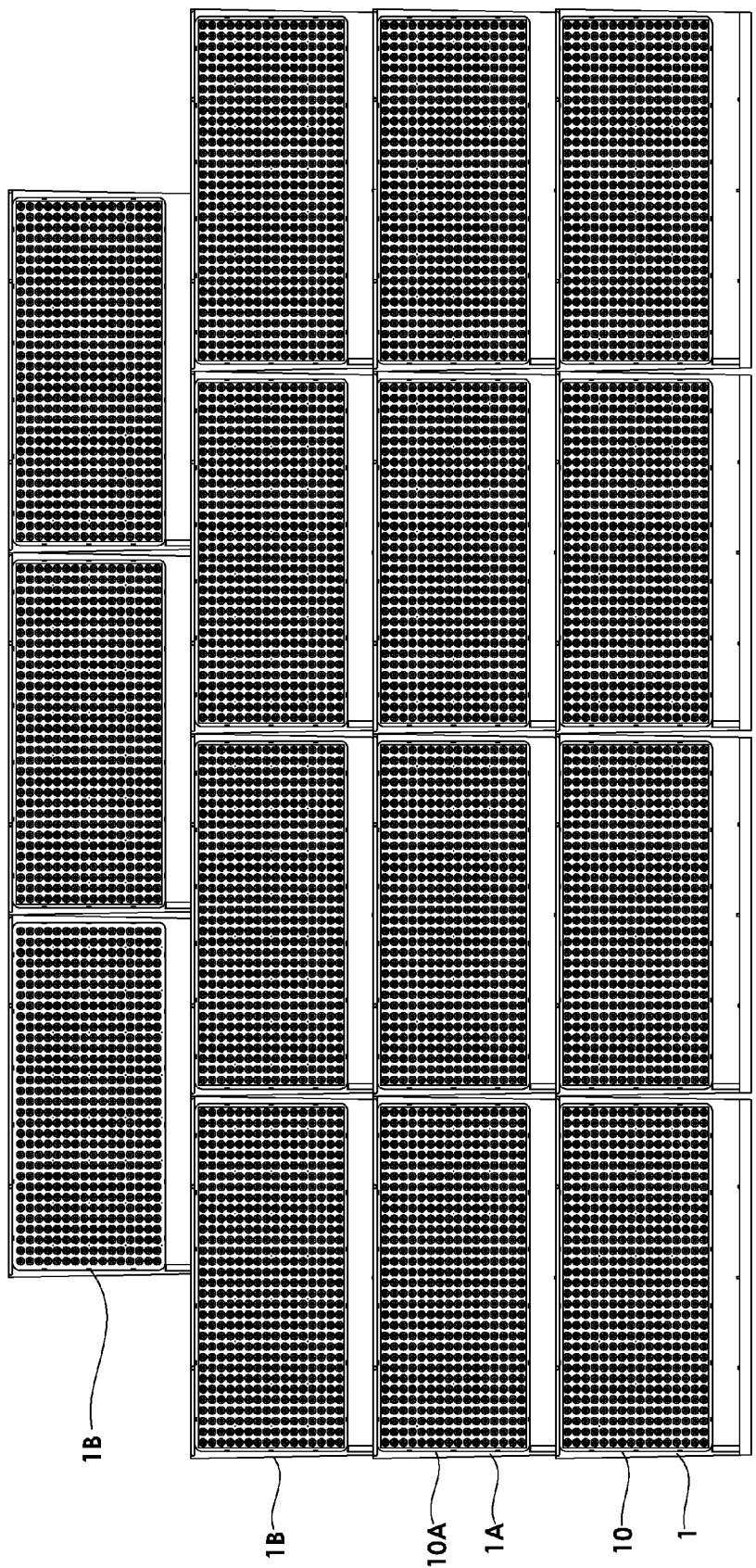
FIG. 13 is a schematic view showing the connected planting containers to build a large-sized planting wall.

According to the aforesaid embodiment, as shown in FIG. 2 and FIG. 3, the two side wall boards 12, the rear wall board 13, and the front wall board 14 are inclined outwardly from the bottom board 11 of the container main body 10 to form the soil accommodation room 15 which is tapered from top to bottom. As shown in FIG. 2 and FIG. 10, before the upper water storage trough 17 and the planting panel 20 are assembled to the rear wall board 13 and the front wall board 14, the upper water storage 17 and the planting panel 20 can be placed in the lower water storage trough 16. As shown in FIG. 11, when not in use, a plurality of planting containers 1, 1A can be stacked through the container main bodies 10, 10A to reduce the space for carrying, transportation, and storage. As shown in FIG. 1 and FIG. 2, the upper edges of the rear wall board 13 and the front wall board 14 of the container main body 10 are provided with two pairs of handles 19 close to the two side wall boards 12. Each handle 19 has a grip 190 which is transversely disposed between the rear wall board 13 and the front wall board 14. The upper and lower edges of the rear wall board 13 and the front wall board 14 have upper engaging recesses 100 and lower engaging recesses 101 corresponding in position to the grips 190 of the handles 19 for the grips 190 to be inserted therein. As shown in FIG. 11, when the container main bodies 10, 10A of the planting containers 1, 1A are stacked, the grips 190 of the handles 19 can be lifted to separate the container main body 10 from the container main body 10A. As shown in FIG. 1 and FIG. 12, after the grips 190 of the handles 19 of the container main body 10 are turned to be engaged in the upper engaging recesses 100, the bottom of the other container main body 10A is positioned and supported by the grips 190 of the handles 19 engaged in the lower engaging recesses 101. As shown in FIG. 13, a plurality of planting containers 1, 1A can be connected with each other to build a large-sized planting wall. As shown in FIG. 12 and FIG. 13, every two planting containers 1, 1A are stacked each other. The upper water storage trough 17 of the lower container main body 10 is aligned with the drain hole 161 of the upper container main body 10A. When the uppermost planting container 1B is watered, each of the lower planting containers 1, 1A can get water in sequence. As shown in FIG. 1, FIG. 2, and FIG. 12, the rear wall board 13 of the container main body 10 is formed with a plurality of nail holes 13 disposed near the upper edge of the rear wall board 13. When the planting containers 1, 1A are connected with each other, they can be fixed to the wall by nails 50 inserted through the nail holes 131 to enhance the safety.

While the invention has been described in terms of preferred embodiments, those skilled in the art will recognize that the invention can be practiced with modifications within the spirit and scope of the appended claims.

What is claimed is:

1. A planting wall container structure, comprising a planting container, the planting container comprising a container main body and a planting panel;
   the container main body comprising a bottom board, two side wall boards, a rear wall board, and a front wall board extending upward to form a soil accommodation room; a lower water storage trough being formed in the soil accommodation room above the bottom board, a space being formed beside the lower water storage trough, the bottom board being formed with at least one drain hole so that water flowing to the space can be drained through the drain hole, the rear wall board being provided with at least one upper water storage trough, a liquid pass space being formed between the upper water storage trough and the front wall board, the front wall board being formed with a plurality of through holes; the planting panel being a flexible panel, the planting panel being mounted on the front wall board of the container main body, the planting panel having a plurality of hole sealing portions corresponding to the through holes, each of the hole sealing portions having a central aperture, a plurality of cut lines extending from a wall of the central aperture and being arranged radially to form a plurality of clip pieces.

2. The planting wall container structure as claimed in claim 1, wherein the bottom board of the container main body is provided with a water tray.

3. The planting wall container structure as claimed in claim 1, wherein the front wall board of the container main body has a plurality of hole members around the through holes, and the planting panel is provided with a plurality of buckle members corresponding in position to the hole members.

4. The planting wall container structure as claimed in claim 1, wherein the rear wall board of the container main body has a plurality of notches which are disposed at an equal altitude, and the upper water storage trough is provided with a plurality of hooks corresponding to the notches.

5. The planting wall container structure as claimed in claim 1, wherein the two side wall boards, the rear wall board, and the front wall board are inclined outwardly from the bottom board of the container main body to form the soil accommodation room which is tapered from top bottom.

6. The planting wall container structure as claimed in claim 5, wherein upper edges of the rear wall board and the front wall board of the container main body are provided with two pairs of handles close to the two side wall boards, each of the handles having a grip which is transversely disposed between the rear wall board and the front wall board, the upper and lower edges of the rear wall board and the front wall board having upper engaging recesses and lower engaging recesses corresponding to the grips of the handles for the grips to be inserted therein.

7. The planting wall container structure as claimed in claim 6, wherein the rear wall board of the container main body is formed with a plurality of nail holes disposed near the upper edge of the rear wall board.

* * * * *